July 3, 1962 M. ZAVATTARO 3,042,913

ELECTROACOUSTIC WARNING HORN FOR MOTOR VEHICLES

Filed July 14, 1959

United States Patent Office 3,042,913

Patented July 3, 1962

3,042,913
ELECTROACOUSTIC WARNING HORN FOR MOTOR VEHICLES

Mario Zavattaro, Milan, Italy, assignor to Fabbrica Italiana Magneti Marelli S.p.A., Milan, Italy, a firm Filed July 14, 1959, Ser. No. 827,058
Claims priority, application Italy July 16, 1958
5 Claims. (Cl. 340—388)

This invention refers to an electroacoustic warning horn, particularly for motor vehicles of the kind that comprises substantially a vibration periodically underlying diaphragm and a vibrating disc that is centrally connected to said diaphragm.

It is well known that warning devices of this kind utilize a diffusion member such as a disc with uniform thickness or tapered at its periphery or one that has an edge protuberance at one of its sides. The vibrating disc can exert its influence in a positional way on sound intensity, audibility and direction.

A significant improvement of these features can be effected according to the present invention, if the diffusion disc is shaped at one side with a number of concentric circular rings with triangular sections.

In such a way a concentration of the irradiated energy is possible thereby effecting greater sound audibility in the noise areas and with less disagreeable timbre for the ears.

Further features and advantages of the present invention will be specified and illustrated with reference to the accompanying drawings, wherein.

Figures 1, 4, 5:
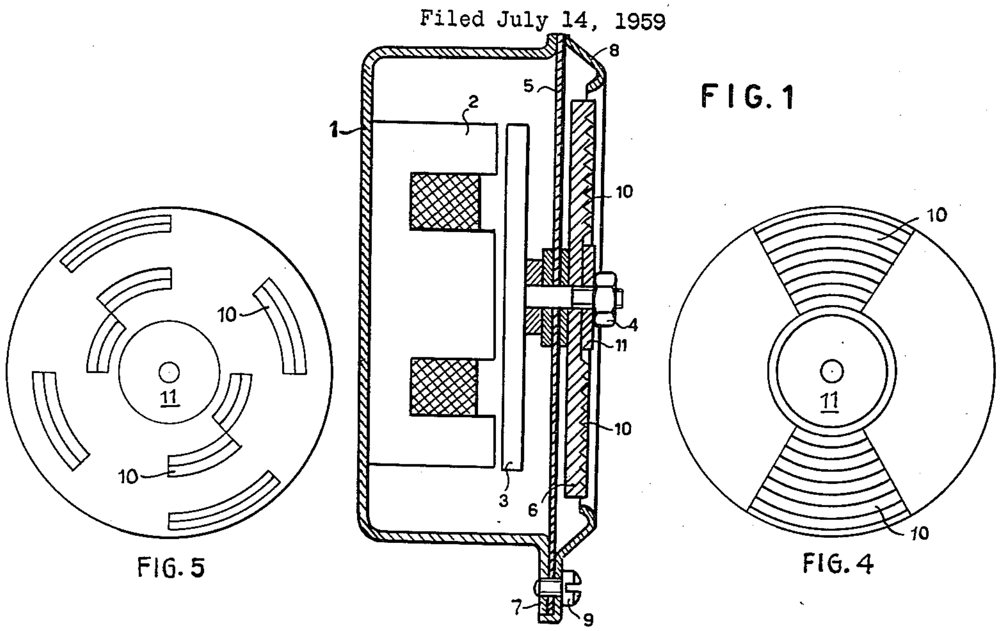
FIG. 1 is a diagrammatic cross section of the electroacoustic device.
FIG. 4 is a view of a disc having discontinuous grooves formed as parallel circular arcs.
FIG. 5 is a view of a disc having discontinuous grooves formed as staggered circular arcs.
Figure 2:
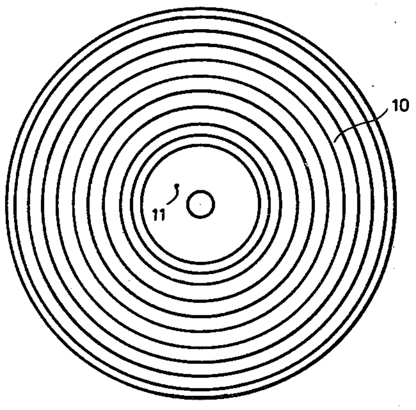
FIG. 2 shows a view of shaped part of the vibrating disc.
Figure 3:
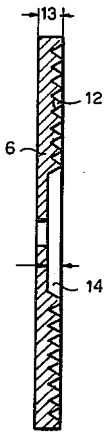
FIG. 3 is a cross section of the disc as shown in FIG. 2.

The device is comprised of a casing 1 to which an electromagnet 2 that is periodically fed by pulses of electric current is secured.

A small armature 3 of ferromagnetic material is positioned opposite to the poles of said electromagnet and rigidly connected to the diaphragm 5 and vibrating disc 6 through a bolt and associated nut 4.

The device can perform free vibrations, since it is supported by the diaphragm 5 inserted between the small armature and the disc, which diaphragm is secured and stretched at its periphery to the casing edge 7 by means of the fastening ring 8 and screws 9.

The vibrating disc according to the invention has a flat surface at the side thereof that is opposite to the diaphragm and a shaped surface on its other side. On this latter side the disc has grooves 10, that are preferably concentric one with another and of triangular section; the central part of said disc is flat with a depressed surface 11.

The apex angle 12 of the little triangles as well as the groove depth are dimensioned in relation to the disc thickness and can therefore be altered according to the desired requirements.

If for instance there is desired the greatest possible sound concentration along the horn axis with a very high directional effect, it is advantageous to make the grooves 10 with an apex angle of the triangles that is of about 60°.

If on the other hand the frequency of disc proper is to be altered, this can be accomplished by varying the ratio between groove thickness 13 and depth 14 thereof.

In such a way it is possible for the frequency of disc proper to be a harmonic of the diaphragm vibration frequency and this is a substantially significant feature as far as the sound power and timbre are concerned.

With the disc shaped according to the present invention the best result is obtained when the ratio between the groove depth and disc thickness is substantially 0.5.

Although in the foregoing the present invention has been described with reference to a preferred embodiment thereof, it is to be understood that many changes and modifications are possible without departing from the scope of the present invention. Such changes, for example, may be made as shown in FIGURES 4 and 5 by shaping the grooves 10 in the disc 6 in discontinuous fashion as parallel circular arcs, see FIG. 4, or as staggered circular arcs, see FIG. 5. It is therefore intended that the scope of the present invention be determined by the appended claims.

I claim:

1. In an electroacoustic warning horn having an electromagnet, an armature operatively associated with said electromagnet responsive to energization thereof, a resilient diaphragm to which said armature is centrally affixed, the combination comprising a substantially rigid vibrating diffusion disc centrally affixed to said diaphragm and said armature, a plurality of circular grooves of triangular section on the outer face of said disc, said grooves being of uniformly increasing diameter and concentrically positioned to provide a concentration of the emitted energy with greater sound audibility and less disagreeable timbre, and a circular recess on said disc, said recess being centrally located and of reduced thickness.

2. The combination of claim 1 wherein said grooves are discontinuous forming parallel circular arcs.

3. The combination of claim 1 wherein said grooves are discontinuous forming staggered circular arcs.

4. In an electroacoustic warning horn having an electromagnet, an armature operatively associated with said electromagnet responsive to the energization thereof, a resilient diaphragm spaced from said armature to which said armature is centrally affixed, the combination comprising a substantially rigid vibrating disc spaced from and centrally affixed to said diaphragm on the opposite side thereof from that upon which said armature is affixed, the inner face of said disc being a plane surface and the outer face of said disc having concentric circular grooves therein of triangular section and the ratio between the depth of the grooves therein and the thickness of said disc being substantially 0.5.

5. In an electroacoustic warning horn comprising an electromagnet, an armature operatively associated with said electromagnet responsive to energization thereof, a resilient diaphragm to which said armature is centrally affixed, the combination comprising a substantially rigid circular vibrating diffusion disc centrally affixed to said diaphragm and said armature, said disc being positioned on the side of said diaphragm opposite said armature, the face of said disc closest to said diaphragm being a plain surface, a plurality of circular concentric grooves of triangular section on the outer face of said disc, said grooves being of uniformly increasing diameter and extending substantially midway through the thickness of said disc, and a circular recess located centrally on said disc.

References Cited in the file of this patent

UNITED STATES PATENTS

| | | |
|---|---|---|
| 1,056,475 | Weber | Mar. 18, 1913 |
| 2,018,479 | Zeininger | Oct. 22, 1935 |

FOREIGN PATENTS

| | | |
|---|---|---|
| 731,642 | Great Britain | June 5, 1955 |